United States Patent [19]

Schwartz

[11] Patent Number: 5,426,517

[45] Date of Patent: Jun. 20, 1995

[54] AUTOMATED TONE CORRECTION APPARATUS AND METHOD USING FILTERED HISTOGRAM EQUALIZATION

[75] Inventor: Michael Schwartz, Belmont, Mass.

[73] Assignee: Eastman Kodak Company, Rochester, N.Y.

[21] Appl. No.: 983,151

[22] Filed: Nov. 30, 1992

[51] Int. Cl.⁶ .............................................. H04N 1/60
[52] U.S. Cl. ..................... 358/520; 358/521; 358/522
[58] Field of Search ............... 358/522, 518, 520, 521, 358/458, 455, 465, 466, 519, 504, 527; 348/672, 675; 382/51, 50, 54

[56] References Cited

U.S. PATENT DOCUMENTS

| | | | |
|---|---|---|---|
| 4,654,722 | 3/1987 | Alkofer | 358/522 |
| 4,729,016 | 3/1988 | Alkofer | 358/522 |
| 4,812,903 | 3/1989 | Wagensonner et al. | 358/520 |
| 4,931,864 | 6/1990 | Kawamura et al. | |
| 4,984,071 | 1/1991 | Yonezawa | 358/522 |
| 5,012,333 | 4/1991 | Lee et al. | 358/520 |
| 5,296,920 | 3/1994 | Sakaue et al. | 348/675 |

OTHER PUBLICATIONS

Kodak Precision Color Management VAR Toolkit User's Guide for Macintosh Computers, Colorsense Products, 1991.

*Primary Examiner*—Scott A. Rogers
*Attorney, Agent, or Firm*—Peyton C. Watkins

[57] ABSTRACT

An image processing system redistributes image luminance values in an image represented in u'v'L* space to achieve a near-optimal fit of luminance data to available dynamic range and to enhance the shape and detail of the resultant image. Redistribution may be accomplished by passing the image through a filter having a peak response at a spatial frequency at which the human eye is highly sensitive, and then equalizing a cumulative histogram of filtered pixels. An image may be transformed to compensate for tone compression which accompanies printing processes.

26 Claims, 13 Drawing Sheets

AUTOMATED TONE CORRECTION APPARATUS AND METHOD USING FILTERED HISTOGRAM EQUALIZATION

RELATED APPLICATIONS

Related U.S. patent application Ser. No. 07/983,154, entitled "Image Processing Apparatus and Method with Intelligent Pixel Measurement Cursor" and Ser. No. 07/717,099, entitled "A Color Image Processing System for Preparing a Composite Image Transformation Module for Performing a Plurality of Selected Image Transformations," are incorporated by reference.

BACKGROUND OF THE INVENTION

The present invention relates to image processing systems, and in particular to image processing systems for tonal correction of images.

Image processing systems typically include an input device for generating an electronic representation of an image. The input device provides the electronic image representation to a computer workstation which processes the image in accordance with a user's instructions and forwards the processed image to a high resolution monitor for display. The user interacts with the workstation, repeatedly instructing it to adjust the electronic image until the monitor displays a desired image. The user can also generate a hard copy of the image by instructing the workstation to provide the processed electronic image to a selected printing device.

An exemplary image processing system is shown in FIG. 1. In this Figure, an image is input to the system by scanning hardcopy with scanner 10. Scanner 10 may be any suitable color or black-and-white scanner, such as a Macintosh-compatible scanner capable of producing 24-bit RGB files. Alternatively, the image may be input through a disk storage unit 12 such as the Kodak PhotoCD system. Images may also be input directly from video cameras and other image sensing devices.

The scanner may generate an image file using a suitable workstation 14 such as a Macintosh II/fx or Macintosh Quadra. The computer typically has a math coprocessor chip. Using the workstation, the overall image may be positioned, scaled and cropped with suitable page composition software such as Aldus PageMaker, Quark XPress, or Letraset Design Studio.

The image also may be processed on an appropriate imaging station 16 such as a Kodak PCS100 workstation, which is built around a Macintosh Quadra 900 platform equipped with a Kodak Precision Color Transform Engine. The PCS100 also uses a 24-bit color graphics card such as the SuperMac Thunder/24 card and color display calibration hardware. Using the PCS100, the operator can make use of the advanced photo editing toolset of the Adobe PhotoShop system.

The image processed by imaging station 16 may be sent to a proofer 20 for hardcopy output. The proofer may be any suitable compatible with the imaging station. Preferably, data interchange between the imaging station and the proofer is accomplished in a four color separation format such as DCS CMYK format, EPS CMYK format, or Scitex CT format.

While an image may be processed as above, it may also be sent to a suitable publishing system 18 such as the Kodak Prophecy system, which is built around an image accelerator-equipped Sun SPARC platform. The publishing system allows the operator to "soft-proof" the image by correcting the image to compensate for printing characteristics and by manipulating the image characteristics with a set of easily understood icons. Using the Prophecy system, an operator can perform many image manipulation operations such as tone and contrast correction, cast removal, image sharpening and blurring, silhouetting, selective color changes, cloning, masking, image rotation, and OPI substitution.

The electronic image processed by the workstation consists of a two-dimensional array of picture elements (pixels). Each pixel may be represented in any of a variety of color notations or "color spaces". For example, the RGB color space represents pixel according to the relative contributions of three primary colors, red, green, and blue. This notation is commonly used by color monitors since the three parameters (R, G, and B) correspond to the mechanism by which the monitor generates color. More specifically, each pixel of the monitor's display contains a red phosphor, a green phosphor, and a blue phosphor. To generate a color defined by a set of RGB values, the monitor stimulates each primary phosphor with an intensity determined by the appropriate pixel's corresponding RGB value.

Similarly, the CMYK space represents color using four variables, C, M, Y, K, each corresponding to the relative (subtractive) contribution of the colorants, cyan, magenta, yellow and black. This representation is commonly used by printing devices since each parameter C, M, Y and K determines the amount of a colorant (e.g., ink or dye) used by the printer in producing a desired color. Notations such as RGB and CMYK are useful for image scanning devices and image printing devices, respectively, since each parameter of the space closely corresponds to a physical mechanism by which these devices measure and generate color.

These spaces may not be well-suited for processing images. For example, as shown in FIG. 2, the three parameters R, G and B define a three dimensional space with each point within the space corresponding to a unique color combination. At various points within the space, a selected change in the values of the parameters may not result in a commensurate change in the perceived color. For example, at a location in the space having a high R parameter value, increasing the parameter R by n units might yield little perceived change in color. Yet, at another point in the space having a relatively low R parameter value, an increase of the same n units yields a dramatic change in the perceived color. Accordingly, it may be difficult for a user to manipulate the primaries R, G, B to achieve a desired change in color.

In response to this problem, a variety of perceptually-based spaces have been proposed for defining colors in terms of parameters which more closely correspond to the manner in which humans perceive color. The most prominent perceptually-based standards for such representation are collectively referred to as the CIE system, which is promulgated by the International Commission on Illumination.

The "u'v'L*" space, for example, is a three dimensional space. The chromaticity of each point in this space is uniformly characterized by the parameters u' and v'. The third parameter, L*, denotes perceptually uniform variations in the lightness, (e.g., $L^* = 0$ is black, $L^* =$ full-scale is white). Luminance values in a u'v'L* representation will be noted by the symbol "L".

To process an image in the u'v'L space, the workstation maps each point $u'_0$, $v'_0$, $L_0$ in the space to a new point $u'_1$, $v'_1$, $L_1$. For example, if the user wishes to display the image on a monitor, he may need to adjust the image to compensate for bright lighting conditions of the room. Accordingly, the user may select a transform which maps each point $u'_0$, $v'_0$, $L_0$ to a new point having the same values $u'_0$, $v'_0$ but having a greater luminance value $L_1$.

One technique for tonal correction applied in the prior art consists of adjusting the pixels in an image in such a way that the shadows and highlights within the image are mapped to specific target values. These methods are useful in adjusting the overall brightness and dynamic range of an image; however, they are not effective at adjusting midtone gray levels.

U.S. Pat. No. 4,729,016 to Alkofer describes techniques for tonal correction using histograms. The Alkofer technique is based on two assumptions. First, an optimal tone reproduction curve for a natural image should remove all tonal remappings performed by the capture process, thereby restoring the tonality of the original scene. Second, the distribution of luminance values on edges within a natural scene should be Gaussian. Given these assumptions one could measure the actual tonal distribution on edges in an image, compare that distribution to a Gaussian distribution, and use the result of the comparison to "back out" the effects of the capture process.

To this end, the Alkofer technique generates histograms from a sample of tone and contrast values. The histogram producing the most normal tone distribution is chosen for the transformation function, and the function is applied to the grayscale value (in a black-and-white system) or to each component in the color space (in a color system).

In many cases one or both of these assumptions are not valid. Not all edges in all scenes have inherently Gaussian luminance distributions. Furthermore, in many color editing applications the goal is the production of a pleasing result rather than the recovery of the original scene appearance.

SUMMARY OF THE INVENTION

It is an object of this invention to provide an image processing system having tonal transformation and correction capabilities that differ from prior art systems by not relying on the same assumptions about how tone should be distributed in an image.

It is a further object to correct tone with minimal assumptions about the nature of the image being processed.

It is yet another object to utilize a wide range of information present in an image to be processed and to produce pleasing results in a wide variety of images.

The above objects are achieved by providing an image processing system which redistributes tone in an image to enhance features having a spatial frequency response in a range in which the human eye is most sensitive. Redistribution may be accomplished by linear remapping, histogram equalization, semi-automatic histogram equalization of normalized filtered luminance data, and automatic histogram equalization of normalized filtered luminance data.

BRIEF DESCRIPTION OF THE DRAWINGS

These and other objects and advantages of this invention will become apparent and more readily appreciated from the following description of the presently preferred exemplary embodiments, taken in conjunction with the accompanying drawings, of which.

DETAILED DESCRIPTION OF THE PRESENTLY PREFERRED EXEMPLARY EMBODIMENTS

It should be understood at the outset that the present invention is widely applicable in any of a variety of electronic systems which manage images. The invention will be described using luminance in a u'v'L color space as a measure of tone, however, the invention may also use other measures of tone, such as brightness or other basis of a color space.

Figure 1:
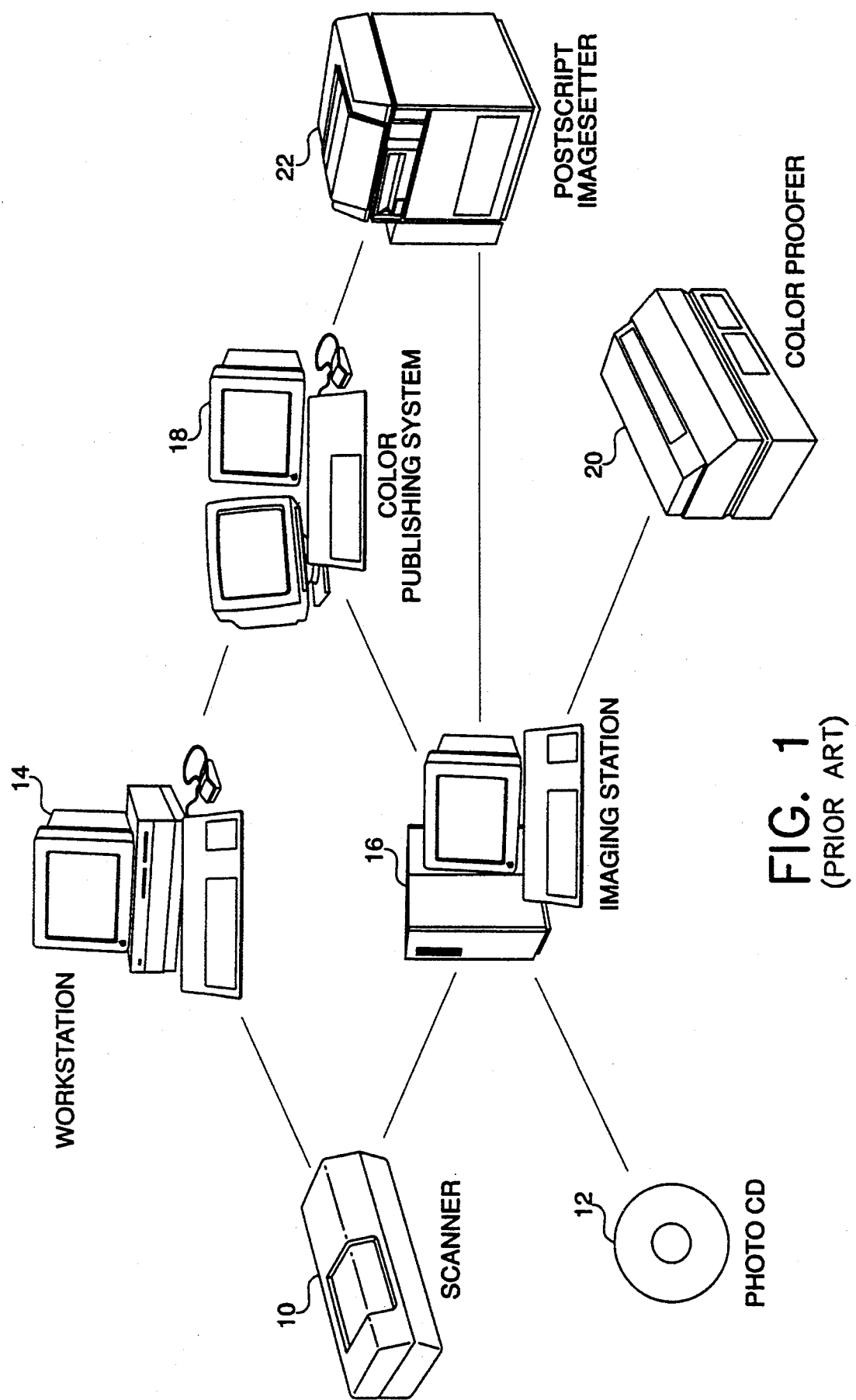
FIG. 1 is a diagram of an exemplary image processing system.
Figure 2:
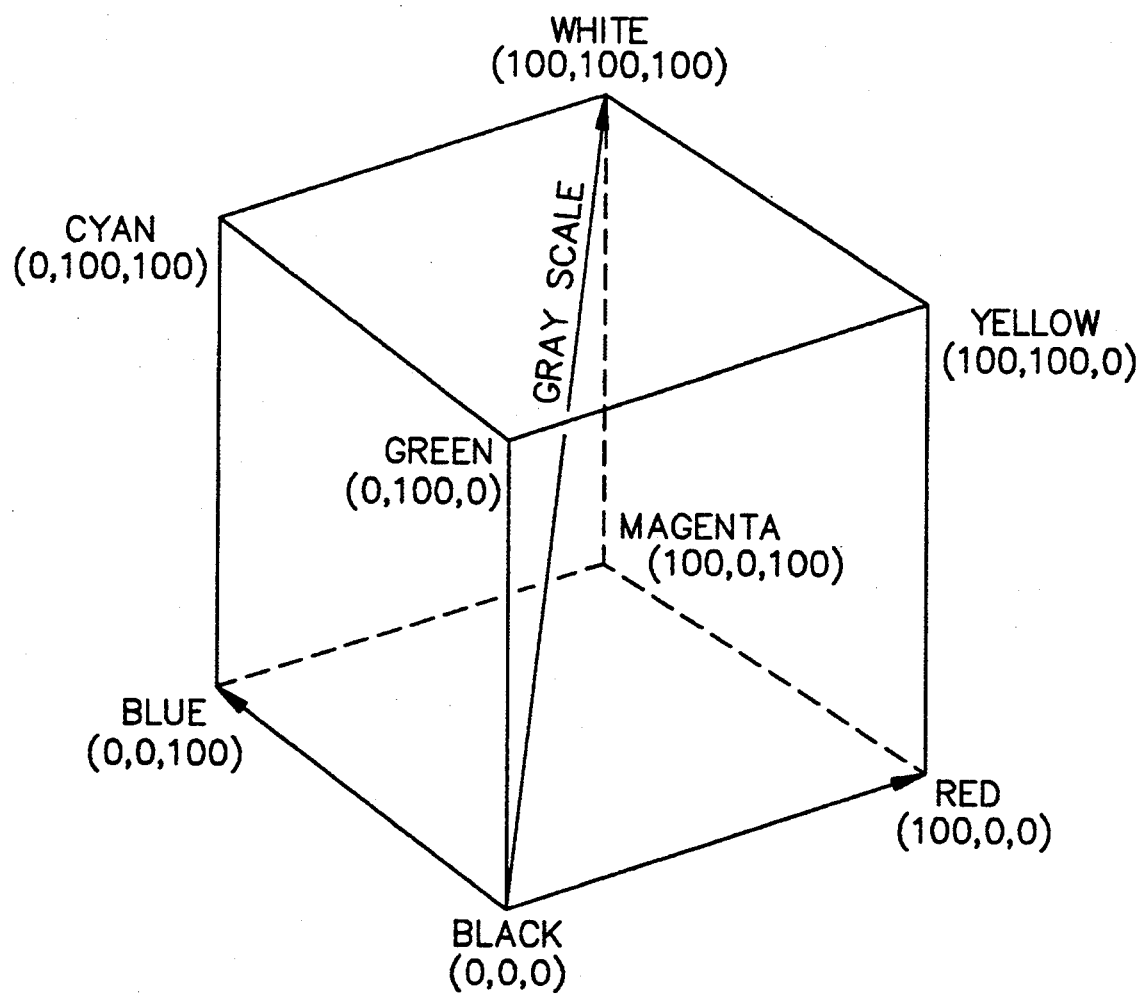
FIG. 2 is a three-dimensional graph of a gray scale in a RGB space.
Figure 3:
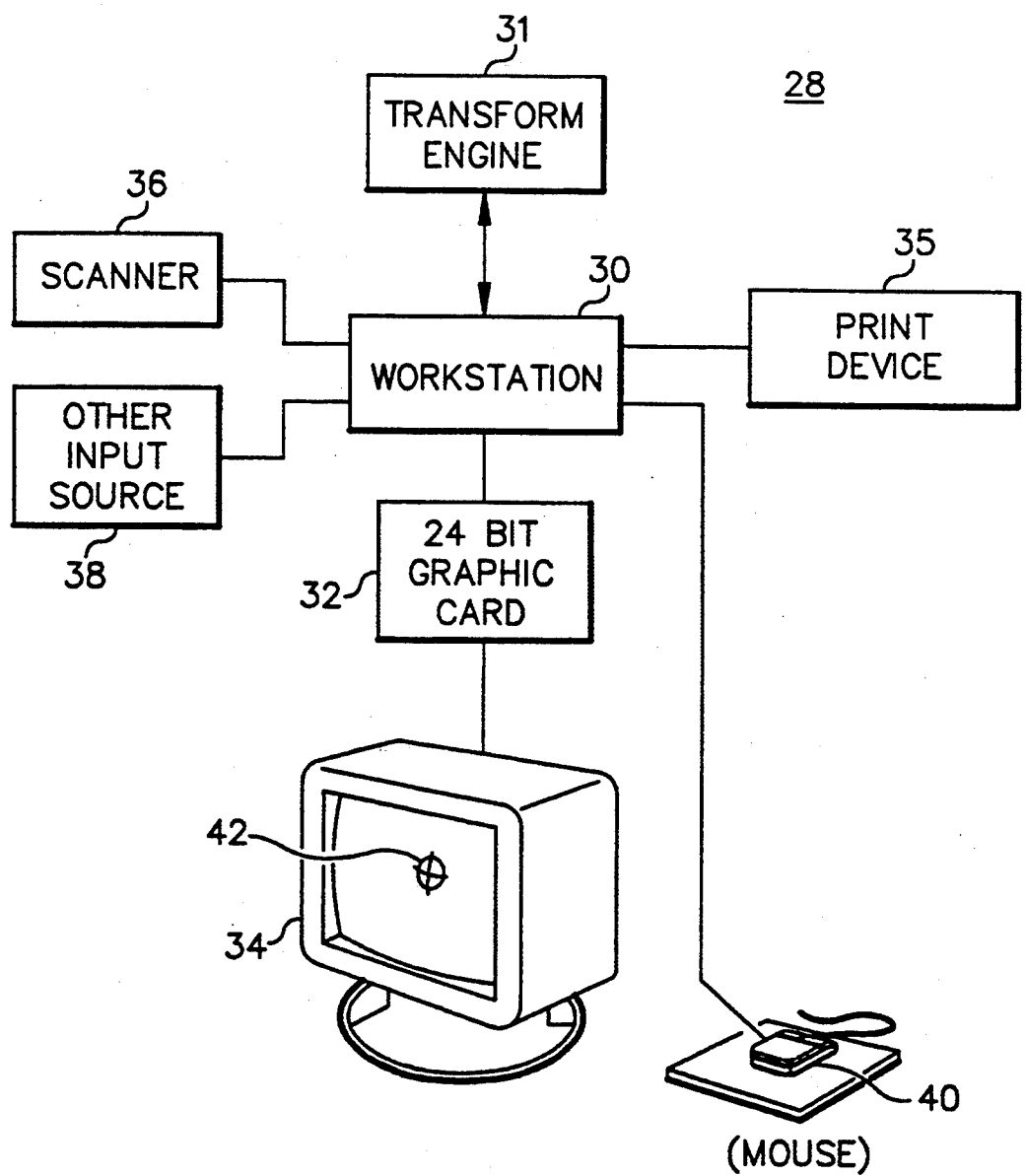
FIG. 3 is a block diagram of an image processing system embodying the present invention.

The invention may also be embodied as part of a system as illustrated in FIG. 3. A workstation 30, such as a Macintosh II/fx or Quadra computer, is equipped with a 24-bit graphics card 32 and a color monitor 34. Standard Macintosh Toolbox routines are used to display pictures on the color screen. Standard Macintosh menus allow the operator to control the operation of the machine, and a tonal transformation as described below may be embodied as an application program.

The system may also include capability for implementing Precision Transforms of a variety described in copending U.S. patent application Ser. No. 07/717,099, entitled "A Color Image Processing System for Preparing a Composite Image Transformation Module for Performing a Plurality of Selected Image Transformations" (incorporated here by reference). Color management tools and a Color Transform Engine of the types described in Kodak Precision CMS VAR User's Guide (incorporated by reference and available from Kodak Electronic Printing System, Inc., Billerica, Mass.) are preferred when system image processing speed is an important factor.

The operator begins by reading a picture into the system from a scanner 36 or other input device which produces an electronic image representation. The image is displayed on the color monitor 34. In order to make accurate color judgments about the picture, the displayed image is modified by a monitor calibration Precision Transform which compensates for the characteristics of the monitor 34.

The operator also has the option of selecting an output gamut transformation and associating it with the image. The output gamut transform corresponds to a printing device 35 and modifies the displayed image to reflect printer characteristics. In this way, what the operator sees on the display closely represents what the operator will get when printing the image.

The operator can select from a pull down menu a tonal transform of the present invention as described in more detail below. The system applies the transform and returns a modified image which may then be displayed, stored, transmitted or subjected to further processing.

Before describing the details of the transform, it is helpful to understand histogram equalization. Histogram equalization implements a redistribution of brightness values such that a cumulative histogram of the result is linear. This process is more easily explained with reference to FIGS. 4-7.

Figure 4:
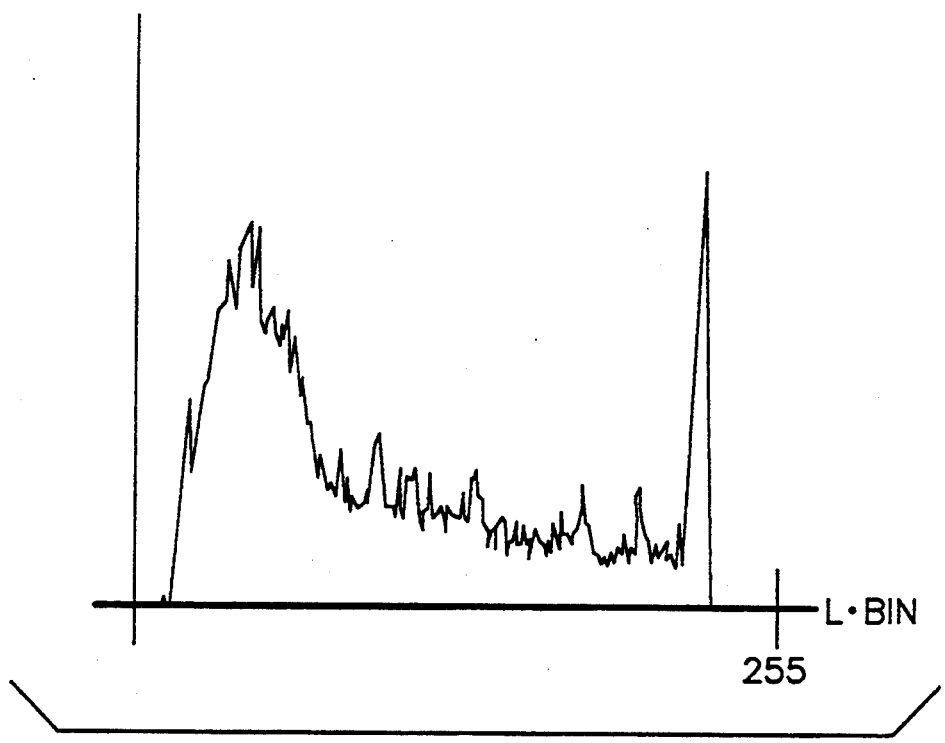
FIG. 4 is a histogram of luminance values in a sample image.

A luminance histogram of a sample image to be processed can be visualized as shown in FIG. 4. For each luminance level $L_{bin}$, the number of pixels at that luminance level is counted. These counts are plotted with the $L_{bin}$ values on the abscissa (horizontal) axis and the counts on the ordinate (vertical) axis, thereby producing a graph as shown in FIG. 4.

Figure 5:
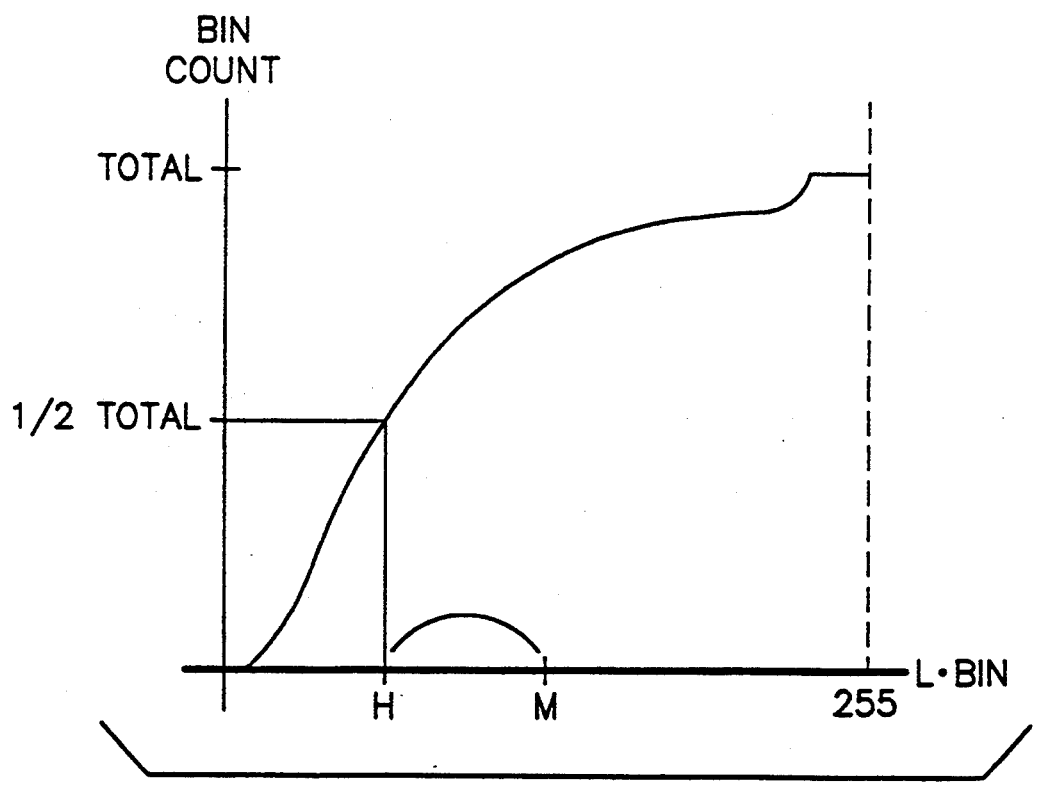
FIG. 5 is a cumulative histogram of the histogram of FIG. 4.

A cumulative luminance histogram of the sample image may be visualized as shown in FIG. 5. For each luminance level $L_{bin}$, the number of pixels at or below that luminance level is counted. These cumulative counts are plotted with the $L_{bin}$ values on the abscissa axis and the cumulative counts on the ordinate axis, thereby producing a cumulative graph as in FIG. 5.

Histogram equalization transforms pixel luminance values so that the resulting cumulative histogram is linear. For example, if half of the pixels in the image have luminance values at or below luminance $L_{bin}=H$ as shown in FIG. 5 and H is not the middle of the luminance range (luminance $L_{bin}=M$), then all pixels having luminance H are converted to have a luminance M. Other pixels are mapped accordingly.

Figure 6:
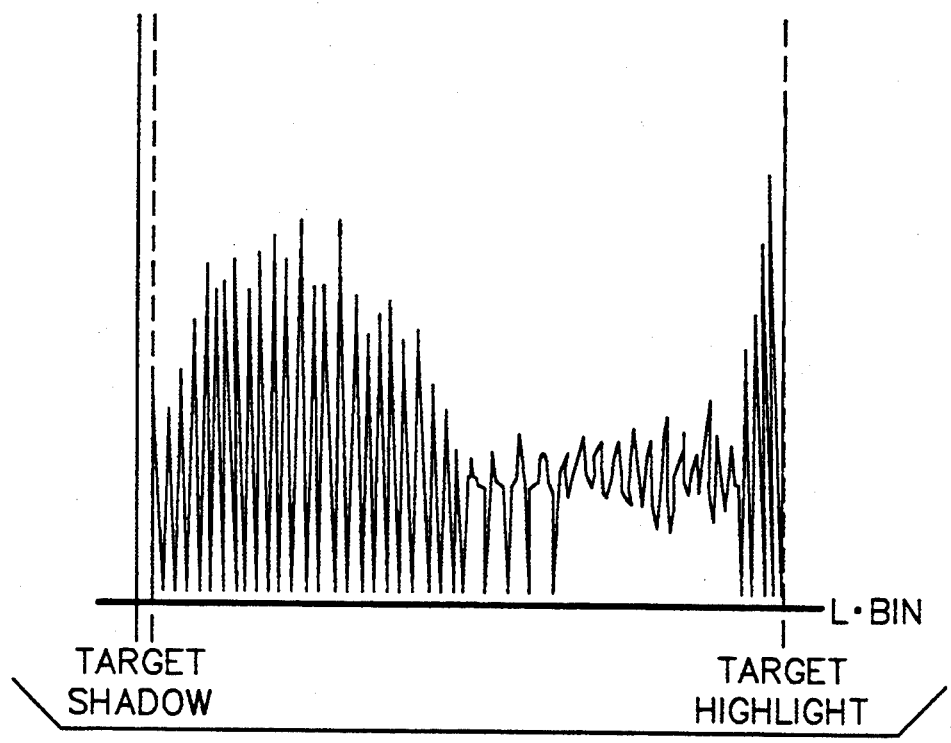
FIG. 6 is a remapped histogram of luminance values of the image of FIG. 4.
Figure 7:
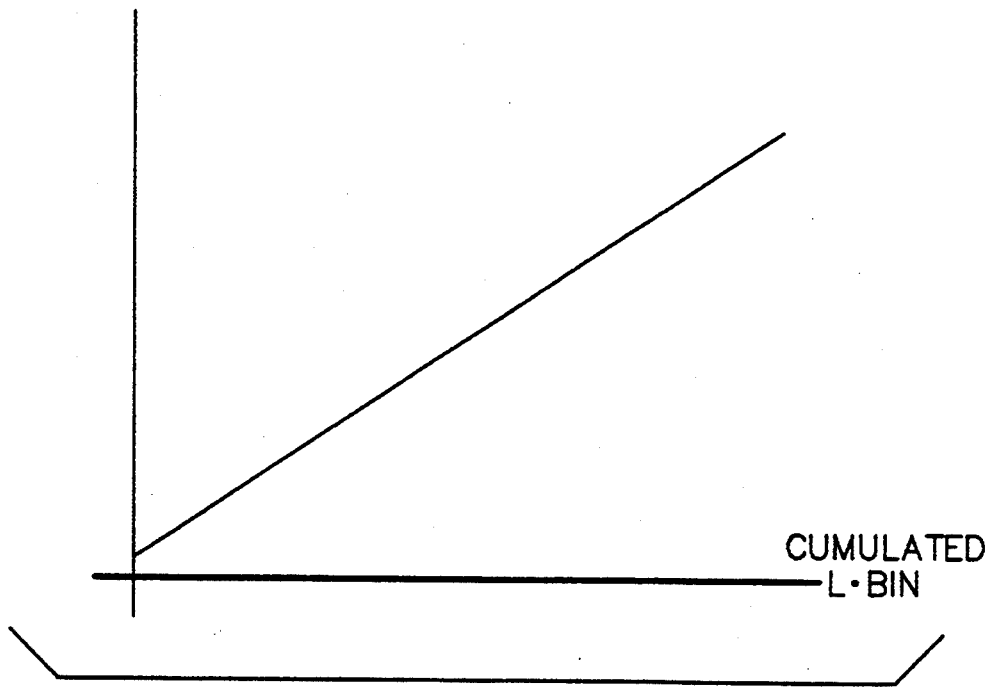
FIG. 7 is a cumulative histogram of the luminance values of the remapped histogram of FIG. 6.

The luminance histogram resulting after applying this transformation to the image luminance values L is shown in FIG. 6, and the cumulative histogram is shown in FIG. 7. As shown by the remapped cumulative histogram of FIG. 7, the effect of histogram equalization is to spread the bins between the target shadow and highlight. This can be seen by the relative flatness of the remapped histogram of FIG. 6 as well as the linear cumulative effect shown in FIG. 7. (The remaining variation in the histograms of FIGS. 6 and 7 is due to sampling and quantization error in the picture data.)

Basic Tonal Transformation

A method of tonal correction of an image using cumulative histogram equalization of normalized filtered luminance values will now be described. This technique incorporates cumulative histogram remapping as previously described; however, the histogram which is equalized is not a standard histogram but rather is a histogram whose values (counts) depend on the spatial frequency content of the picture as well as on its luminance content.

Stated briefly, filtered histogram equalization proceeds as follows:

(1) the image luminance component is passed through a spatial filter having a peak response in the region where the human eye is most sensitive;

(2) a normal histogram of the luminance component is computed;

(3) a weighted histogram is computed in which points with a higher filtered value make a greater contribution;

(4) the weighted histogram is cumulated; and (5) the cumulated histogram is linearized.

The purpose of the filtering step is to produce a tonal remapping which tends to increase the contrast in areas of the picture containing a large amount of medium sized detail or medium-sharpness edges. The eye is most sensitive to medium sized detail and therefore tends to be pleased by pictures in which such detail is easy to see. In terms of frequency response, this requirement means that the filter response should peak at medium frequencies and attenuate at high and low frequencies.

To be more quantitative, the eye's response peaks at approximately 2.5 lines/mm if an object is being viewed at 15 inches. The scanners commonly used by the types of systems described here tend to sample pictures at about 300 pixels/inch or approximately 12 pixels/mm. Thus, for typical pictures, the filter should have its peak frequency response at about 1/5 the sampling frequency. Of course, one can readily adjust the filter response for other scanning rates.

Figure 8:
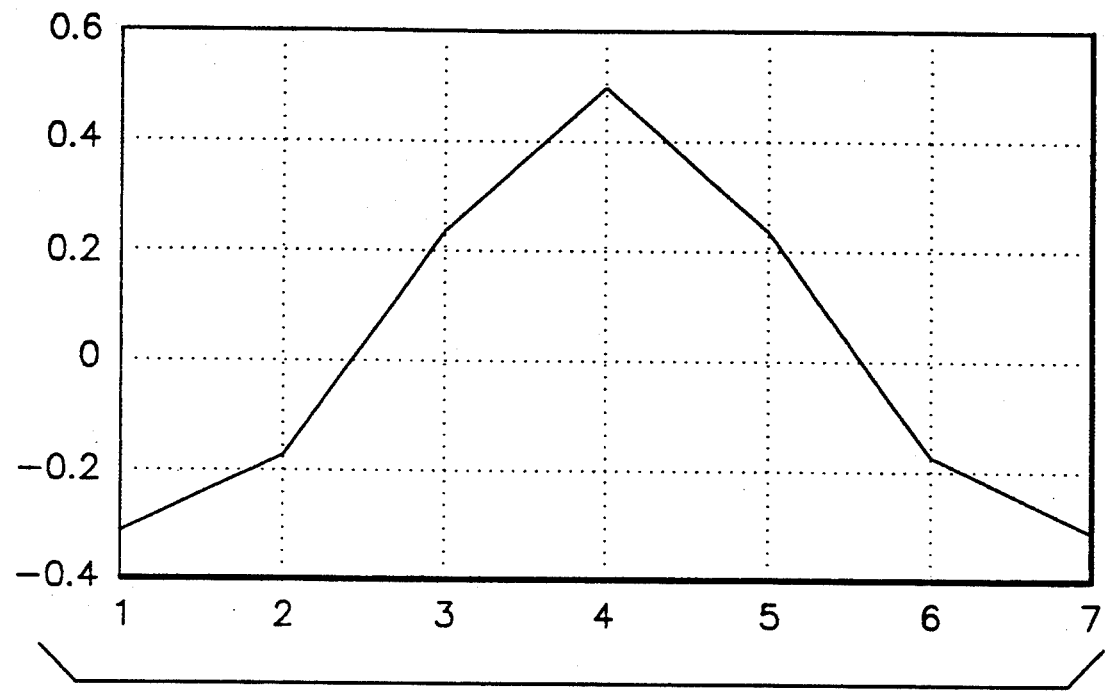
FIG. 8 is a graph of a seven-point filter used for the histogram equalization function.
Figure 9:
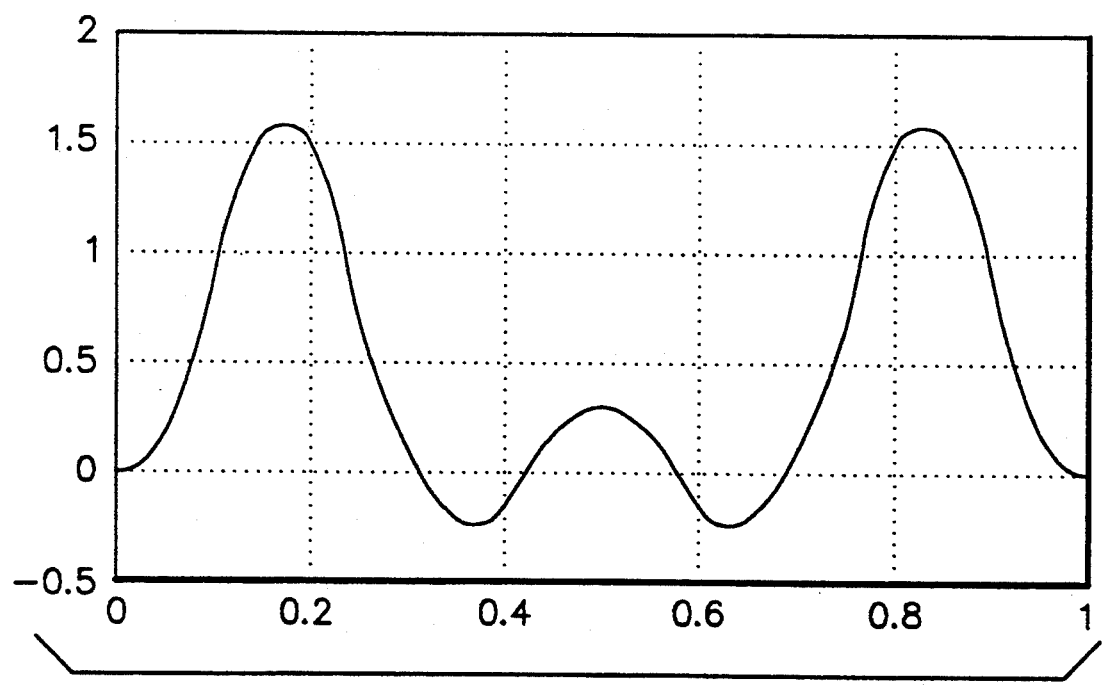
FIG. 9 is a graph of the frequency response of the filter of FIG. 9.

FIGS. 8 and 9 show a suitable seven-point filter and its frequency characteristic. A wider filter would allow for better control over the shape of the transform, but at the expense of greater computational time. A fifteen point filter has been shown to have only a small additional effect on the final tonal transfer function.

The seven-point filter may be implemented in an image processing workstation in a purely hardware implementation or by using a software filter, thus producing a realized frequency response result as shown in FIG. 9.

The filtering process attempts to give the greatest weight to those brightness patterns that are at the peak frequency response of the human eye. Conceptually, one can imagine an "Effect" function as:

$$\text{Effect}(x,y) = \text{Filter} * \text{Picture} \qquad (1)$$

where * is the convolution operator, Filter is the above-described filter function and Picture is an array representing the image pixels in u'v'L space. Because the filter has no DC component, the resulting Effect value is equally likely to be positive or negative. The positive results may be interpreted as points at or near bright sides of edges, while the negative values represent points at or near the shadow sides.

The filtered values are processed through a nonlinearity to produce a net effect function designated as:

$$\text{NetEffect}(x,y) = \text{NonLinearity}(\text{Effect}(x,y)) \qquad (2)$$

where NonLinearity may be any nonlinear function which preserves the sign of Effect, and (x,y) are spatial coordinates designating a pixel in the image. The cube root function is advantageously used for the nonlinearity. The impact of the Nonlinearity function is to even out the importance of large and medium sized gradients.

Once the NetEffect function has been computed, three histograms are made: a normal histogram of pixel counts, a histogram accumulating positive NetEffect values (representing the bright side of edges), and a histogram accumulating negative NetEffect values (representing the shadow side of edges).

The normal histogram is computed in the standard way from L values of pixels from the image. For each pixel of the image, a histogram bin corresponding to the brightness of that pixel is incremented.

The computation of the edge histograms is similar but uses NetEffect values. As with the normal histogram, for each pixel of the image, the histogram bin corresponding to the brightness of that pixel is incremented. However, unlike the normal histogram, the size of the increment depends on the NetEffect function described above. If the NetEffect function is positive, the second histogram is incremented by an amount equal to the value of the NetEffect function at that pixel. If the NetEffect function is negative, the third histogram is incremented by an amount equal to the absolute value of the NetEffect function at that pixel. Thus, the two "edge" histograms represent the total amount of medium sized spatial detail which is present at each luminance level.

After the three histograms are generated, the histograms may be "cleaned up" by removing spikes. This cleaning has two purposes. First, it cuts down on noise. Because the histograms ultimately will be combined in a ratio, it is important that they be relatively free of noise. The second purpose is to deal with situations where a disproportionately large number of points have occupied a single brightness bin. This situation is particularly likely at the low and high ends of the brightness scale, where the clustering is caused by out of range values in the original photograph or scan.

The spike removal is done for each of the three histograms by computing local thresholds based on average values around each histogram point. Each point of each histogram (i.e., the pixel count or sum of NetEffect values for a given bin) is clipped by this local threshold. The three histograms are then smoothed.

Stated another way, the smoothing process proceeds as follows:

Let: BrightnessHistogram = the histogram of L values.

Let: SmoothFilter be a smoothing filter SmoothLength points long.

For example, SmoothFilter may be given by SmoothFilter = {1, 2, 3, 2, 1} (SmoothLength = 5)

Step 1—Compute local thresholds:
for each luminance bin i, look at the interval i-SmoothLength/2 to i+SmoothLength/2;
compute the average of all points in the interval, excluding the biggest point in the interval;
multiply the average by 2 to get a local threshold value at i (this value 2.0 represents a tradeoff between letting noise in and keeping detail out).

Step 2—Clip the histogram using the local threshold.

Step 3—Convolve the clipped histogram with the smoothing filter.

After spike removal, the edge histograms (designated "HighEdge" for positive NetEffect values and "LowEdge" for negative NetEffect values) are normalized with an additional application of the non-linearity:

$$\text{HighEdge}(L) = \frac{\text{HighEdge}(L)}{\text{Norm}(L)/\text{NonLinearity}(\text{Normal}(L))} \quad (3)$$

$$\text{LowEdge}(B) = \frac{\text{LowEdge}(L)}{\text{Norm}(L)/\text{NonLinearity}(\text{Norm}(L))} \quad (4)$$

for each bin L in the histogram, where Norm(L) is the normal histogram of pixel counts from the entire image.

Once the normalization is complete, the resulting histograms are cumulated. A further adjustment is made to avoid excessive quantization which can happen if a very flat picture is processed. In order to avoid this phenomenon, each cumulated histogram is allowed to rise no more than 4 parts in 256 from one histogram bin to the next.

The final tonal transfer is derived from a linear combination of the average of the high and low edge cumulative histograms. For each brightness B, the High and Low cumulative histogram counts are added and the sum is divided in half. The resulting cumulative histogram is then linearized, and the transformation which linearizes the normalized histogram is applied to the image.

Colorfulness Transform

Remapping brightness using the transformation described above can make objects in an image appear to become more or less colorful, because the colorfulness of objects depends on their brightness. For many types of pictures, this side-effect is beneficial. For other pictures, including pictures which prominently feature people, this side effect is undesirable. Therefore, the system described here provides for a transformation to be made to the chrominance values at each point which compensates for the change in colorfulness. Such a compensation transformation moves the chrominance of a point closer to neutral if the point is being made brighter, and moves the chrominance of a point farther away from neutral if the point is being made darker.

Colorfulness is roughly proportional to the product of brightness and saturation. One compensation transformation moves the chrominance of each pixel towards or away from neutral by an amount which is proportional to the change in brightness (i.e., to the ratio of the input and output brightnesses). However, such a proportional transform tends to overcompensate in situations where large tonal transforms are taking place. Therefore, a more effective compensation takes the average of the input chrominance and the result of the proportional method:

$$u_{out}' = \frac{u_{in}'}{2} + \frac{1}{2}\left[\left(u_{white}' + \frac{L_{in}}{L_{out}}(u_{in}' - u_{white}')\right)\right] \quad (5)$$

$$v_{out}' = \frac{v_{in}'}{2} + \frac{1}{2}\left[\left(v_{white}' + \frac{L_{in}}{L_{out}}(v_{in}' - v_{white}')\right)\right] \quad (6)$$

Because some pictures benefit from the distortion of colorfulness, this variation is optional.

Gamut Compensation

Though an image corrected by the techniques described above will have improved tonal characteristics when represented in u'v'L space, the tonality and color reproduction may be distorted when output to a printer (or other device). Because printers cannot print all colors, all image processing systems which write to printers must apply an additional remapping which maps the colors in an image into the printable gamut for that device. Therefore it is useful to adjust the tonal transformation in a way which allows for this gamut remapping.

A typical gamut remapping needs to accomplish two results. First, it needs to compress the tonal range of the picture so that it fits within the printer's dynamic range. Second, it needs to modify colors which are too saturated to be printed. These results are typically accomplished by reducing the saturation of bright colors, by modifying the brightness (luminance) of such colors, or by some combination of these two operations.

These gamut compression remappings can interfere with the desired tonality and color in two ways. First, the dynamic range compression will distort the desired tonal curve in a direct way. Second, in the case where tonal remapping causes a particular color to become brighter, the saturation compression can cause the new, brighter color to become desaturated. As a consequence, an optimal tonal transform should not try to brighten saturated colors too far beyond the point where they can be printed.

It is desirable to construct a tonal transformation which ultimately results in a printed image with desired tonal qualities. An image processing apparatus which compensates for gamut transforms can be viewed as performing a series of transformations on an image. First is a basic tonal move such as one using cumulative histogram equalization as described above. Then, a gamut-compensation transformation maps image brightness values generated by the basic move into modified brightness values (as discussed in more detail below). Finally, the apparatus maps the modified brightness values into the printer gamut using a printing gamut transform. In practice, these transformations need not be serial, but can be combined into a single composite transformation. However, for ease of understanding, gamut compensation transformations will be discussed individually below.

A first embodiment of a gamut compensation transformation, referred to as neutral compression compensation, will now be described. As discussed above, a printing gamut transform maps colors from the u'v'L color space into a restricted color space which corresponds to printable colors. The inverse of the Gamut transform (denoted as Gamut$^{-1}$) can be thought of as a mapping of colors from the printable region back into the full space. The tonal compression compensation of this embodiment modifies luminance values produced by the basic tonal transform (denoted here as "Basic-Move(L)") by a factor (denoted as "A") to scale the image luminance range. The range is then shifted by adding an offset (denoted as "B") so that the image luminance values fall within the printable range. The scaled and shifted image luminance values are then mapped back into full color space by applying the inverse Gamut transform.

The inverse Gamut transform operates on a point in the full color space, while BasicMove (L) generates only a luminance value. When applying the inverse Gamut transform, neutral chrominance values (denoted as $u_N, v_N$) can be combined with the luminance value to form a point in color space. Stated another way, the gamut compression transform (denoted as GCorrection(L)) can be expressed as:

$$GCorrection(L) = Gamut^{-1}(u_N, v_N, [A \cdot BasicMove(L) + B]) \quad (7)$$

While the gamut compensation transform has been described as if it were a separate transform which scales luminance values, it can be implemented as a limit on the basic tonal transform. That is to say, the gamut compensation transform can be applied to modify the operation of the basic tonal transform, rather than letting the basic transform act first and then remapping the pixels in a subsequent operation.

The neutral compression compensation uniformly distributes the loss of contrast over different brightness levels of the picture. This can be visualized as a linear input/output relationship shown as a straight line in FIG. 10 where the slope of the line corresponds to the factor A and the intercept with the vertical scale is the offset B.

Figure 10:
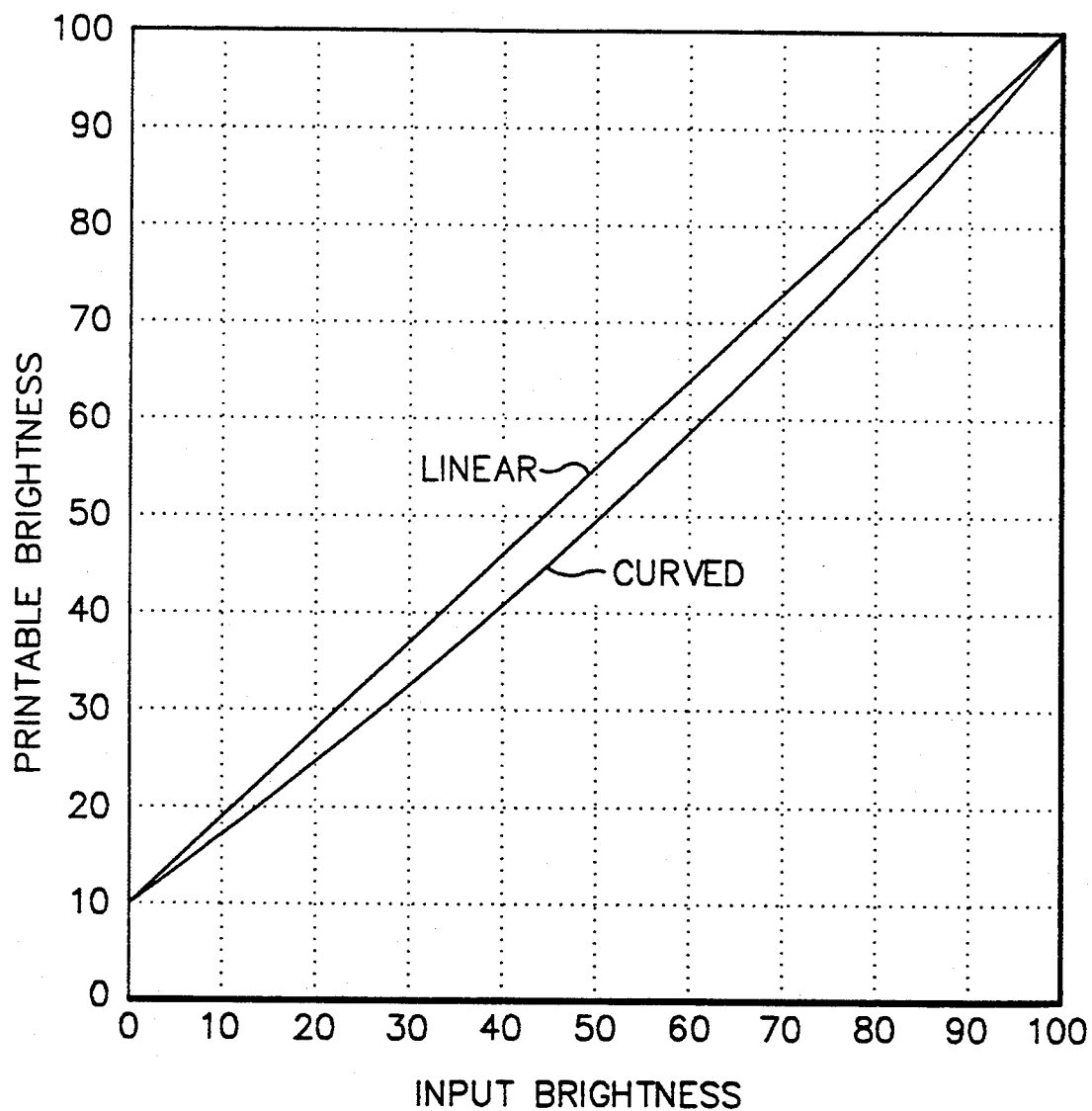
FIG. 10 shows a neutral gamut compression curve according to the present invention.

A more pleasing result seems to occur if slightly more contrast loss occurs in the darker areas of a picture than in the lighter areas. Therefore, an improved version of the neutral compression compensation formula uses an input/output transformation curve whose slope at small brightnesses is slightly smaller than the linear transform and whose slope at large brightnesses is slightly greater than the linear curve. FIG. 10 shows such a transform curve for a typical output (QMS ColorScript TM 100 printer). The curve is a cubic spline which has a curvature of 0 and unit slope at its top end. Insisting on unit slope at L=100 will cause the curve to turn over if the minimum printable brightness is greater than 33 ⅓; however, realistic output systems do not come near this limit.

Expressed another way:

$$GCorrection(c) = Gamut^{-1}(u_n, v_n, C(BasicMove(c)))$$

where C is the curve shown in FIG. 10.

The gamut compensation described above is applied to all pixels regardless of color. Further improvements can be made by separately tailoring the tonal compression for each chrominance value.

A second embodiment of a gamut compensation transformation, referred to as chrominance dependant attenuation, will now be discussed. This transformation prevents saturated colors from becoming so bright that they are unprintable and thus become desaturated by the output gamut compression transform.

This method multiplies each pixel brightness value by a chrominance-dependent attenuation factor. This attenuation factor depends on how bright a color with that chrominance can become without being strongly desaturated by the output gamut compression. Let $Lmax_{u', v'}$ be that brightest value, i.e., the value of L such that the gamut compression transform applied to the color (u', v', $Lmax_{u',v'}$) produces a color change which is less than some predetermined limit. Methods for determining $Lmax_{u', v'}$ will be discussed in more detail below. The chrominance attenuation factor can then be set to $Lmax_{u', v'}/Lwhite$.

An exemplary apparatus applying such a chrominance-dependant attenuation maintains a table of Lmax-(u,v) values. After applying a basic tonal move, the apparatus scales the luminance value (L) of each pixel according to the Lmax value for that pixel's chrominance value (u,v). Denoted another way, the output luminance (output L) resulting from the combined application of the tonal transform (BasicMove) and a gamut compensation transform can be expressed as:

$$output\ L = BasicMove(L) \cdot Lmax_{u,v}/Lwhite \quad (8)$$

Lmax can be determined directly from measurements of a printer's characteristic. Alternately, Lmax can be determined from the printing gamut transform itself. The gamut transform maps colors (u,v,L) which are not printable into colors within the capabilities of a selected printer. The gamut transform maps chrominance and luminance values. The amount of chroma shift (the difference between input u,v and output u,v) can be thought of as a chroma error. The amount of error varies with luminance. That is, chroma error introduced at low luminance will tend to be less than chroma error introduced at higher luminance. The values for Lmax can be taken as a luminance at which the chroma error becomes large by some measure. Denoted another way, chroma shift introduced by the printer gamut transform (denoted as ChromaError) can be expressed as:

$$\text{ChromaError} = L_{out}^2 \cdot [(u' - u'_{out})^2 - (v' - v'_{out})^2] \qquad (9)$$

where
$L_{out}^2$ is the luminance value output from the gamut transform; and
$(u' - u'_{out})$ and $(v' - v'_{out})$ are the chrominance shifts introduced by the gamut compression transform.

The value Lmax(u,v) can be taken to be a luminance at which: a) the chroma error begins growing; b) the chroma error reaches a minimum value or 3) the chroma error exceeds a threshold, e.g., 10–25% of the square of the saturation, u'v' (16% is preferred).

The implementation of a chrominance-dependant attenuation has been described above as an apparatus which maintains a look-up table of Lmax. It should be understood that other implementations can be made for storing information about the printer characteristics, such as parametric descriptions, as long as some measure of printer limit is used.

Chrominance-dependant attenuation, as discussed above, renormalizes the basic tonal remapping curve so that the top of the tonal curve goes to a brightness value which is not too far above the upper limit for a printer. For a given chrominance, the tonal remapping is still linear. That is to say, the scale factor is the same whether luminance is high or low. While this is an improvement over chrominance-independent compensation, further improvements can be made by taking advantage of the fact that gamut compression tends to have a greater impact at high luminance values (since these are outside the printing gamut). While it may be appropriate to scale high luminance values by a factor of Lmax/Lwhite, this factor may unnecessarily darken colors with lower luminance values, such as saturated midtones.

A third embodiment of a gamut compression transformation, referred to as modified chrominance dependant attenuation, will now be discussed. Scaling is still a function of Lmax(u,v). However, the amount of scaling is not a linear factor. Instead, it is a function which apportions more scaling to the higher luminance values and less scaling to lower luminance values. Such a function continues to reach the same maximum attenuation value (Lmax/Lwhite) when the pixel luminance is at full scale. However, it provides a greater slope (less scaling) in shadows and midtones.

Figure 11:
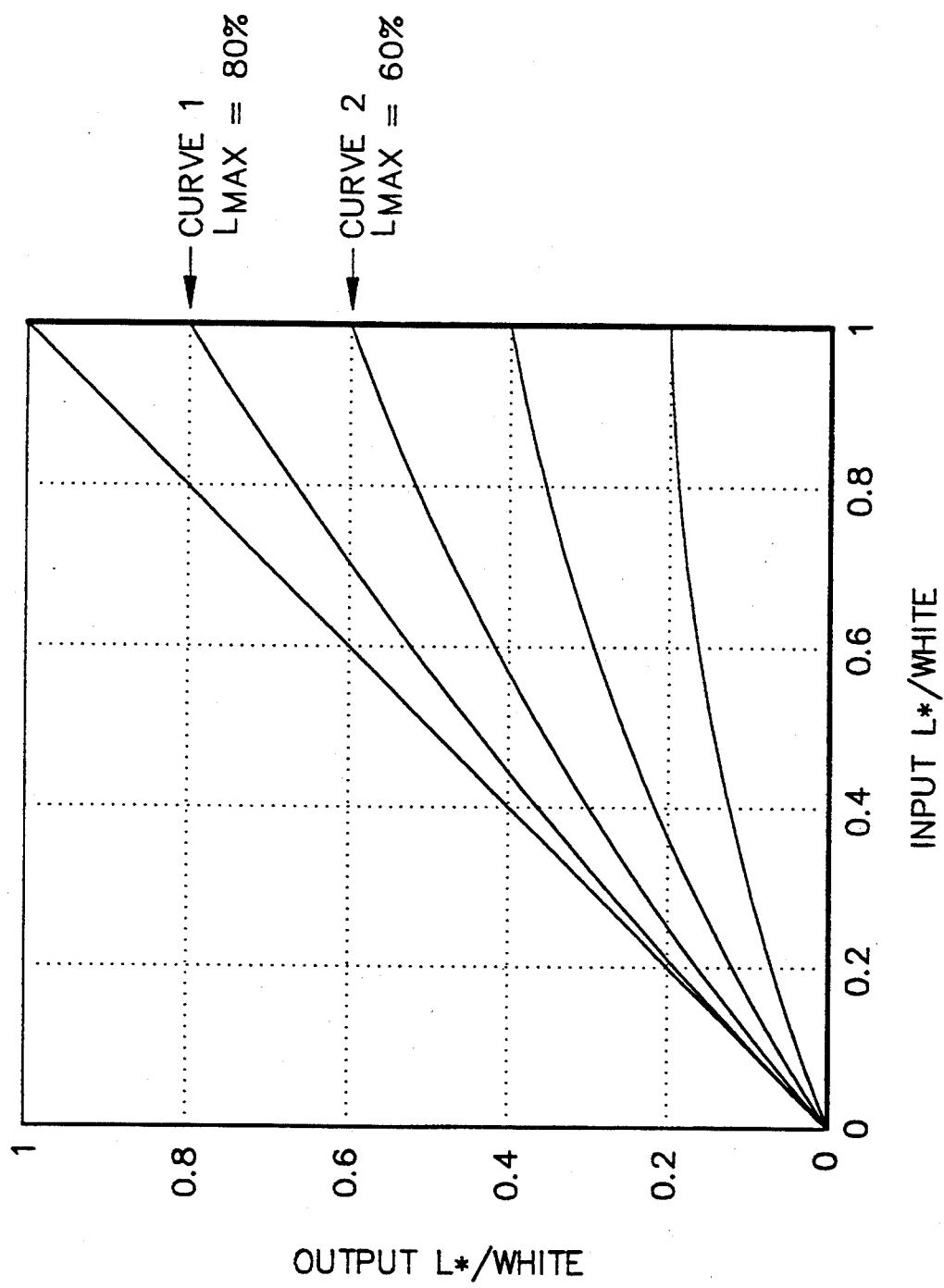
FIG. 11 is a graph illustrating the remapping of luminance values based on maximum luminance values for a given chromaticity.

FIG. 11 is a graph depicting a family of attenuation curves. Along the bottom of the graph are L values (as a percent of full scale) which denote pixel luminance resulting from a basic tonal move. Along the left vertical axis are output L values. Each curve relates an output luminance to an input luminance. Different curves are used for different Lmax values. That is to say, if Lmax for a particular chrominance (u,v) is 80% of full scale, the relationship of curve 1 is used. On the other hand, if Lmax is 60% of full scale, the relationship of curve 2 is used.

Denoted another way, the relationship between Lmax and the modified chrominance-dependant attenuation is a cubic spline having zero curvature at luminance=0 and a slope at the maximum luminance which varies with Lmax:

$$L_{out}(L, Lmax) = \frac{L}{Lwhite} \cdot Lmax \left(1 \cdot t \left(1 - \frac{L}{Lmax}\right)^2\right) \qquad (10)$$

where:
L is input luminance
Lwhite is full luminance; and
the parameter t is a function of Lmax.

The parameter t should be chosen so that the slope at white (Lmax=Lwhite) is one and gradually becomes smaller as Lmax goes to 0. In this way the family of curves varies in a regular way and each curve remains monotonic. A preferred implementation uses the formula:

$$t = \frac{1}{2} \left[1 - \frac{Lmax}{Lwhite}\right]^3$$

With this relationship, the slope at Lwhite, which gives the maximum flattening of contrast is given by $$\text{slope (Lwhite)} = (Lmax/Lwhite)^4$$

Such relationships can be implemented as an interpolated table lookup or other method.

The gamut compensation transforms have been described above for use with gamut compression transforms which map unpintable colors into printable colors in a controlled way. The gamut compensation transforms can also be used alone in systems which do not use gamut compression transforms. Without gamut compensation transforms, output devices inherently will clip or otherwise alter unprintable colors into printable ones. A tonal transform can anticipate such an uncontrolled distortion in the same manner described above for expressly designed gamut compensation transforms.

Operator Control

Yet another embodiment of the current invention provides a mechanism for the operator to modify the transformations described above without changing their local character. The algorithms described above do not recognize objects as such or incorporate any other type of semantic analysis. Therefore, it is possible for them to produce assignments of tonality which are not aesthetically optimal. For this reason, an operator may desire to adjust the output level for one or more objects in the picture. However, even when this adjustment occurs, it is desirable that the tendency of the transform to emphasize detail be retained. It is also desirable that the operator be able to modify the tonal curve without losing the advantages of the gamut compensation transforms. The method described here fulfills this goal and allows the operator to control the shape of the tonal curve without having to specify an excessive number of control points.

The overall tone transformation can be expressed as:

$$L_{out} = Gcorr_{u,v}(OperatorCurve(BasicMove(L_{in}))) \quad (11)$$

where:
- Lout is pixel luminance after a composite tonal move;
- Lin is pixel luminance before a basic tonal move;
- BasicMove is a tonal move;
- $Gcorr_{u,v}$ is a gamut compensation transform; and
- OperatorCurve is a discretionary transform mapping an input luminance to an output luminance.

Creation of an OperatorCurve transform has two parts. First, the operator inputs a series of control points. Each control point specifies an input brightness level which the operator wishes to map to a specific output brightness level. Second, the image processing system fits a low order curve to the set of points $(x_i, y_i)$ where $$x_i = BasicMove(SpecifiedInput_i)$$

$$y_i = Gcorr^{-1}(SpecifiedOutput_i)$$

where $(SpecifiedInput_i, SpecifiedOutput_i)$ is the i'th control point chosen by the operator. In the preferred embodiment this curve is a cubic spline. Note that the resulting curve is not a polynomial in brightness, but is instead a polynomial in BasicMove(brightness). In this way, the local curvature of the transformation remains dominated by the BasicMove.

It is preferred that the system provide the operator with a semi-automatic input process for inputting control points. In this system, the operator places a measurement cursor over a part of a picture which appears to be too light or too dark. The operator then has the option of specifying a desired value for that point which is different from the measured value. The software will then fit a cubic spline through the point which the operator has defined.

Figure 12A:
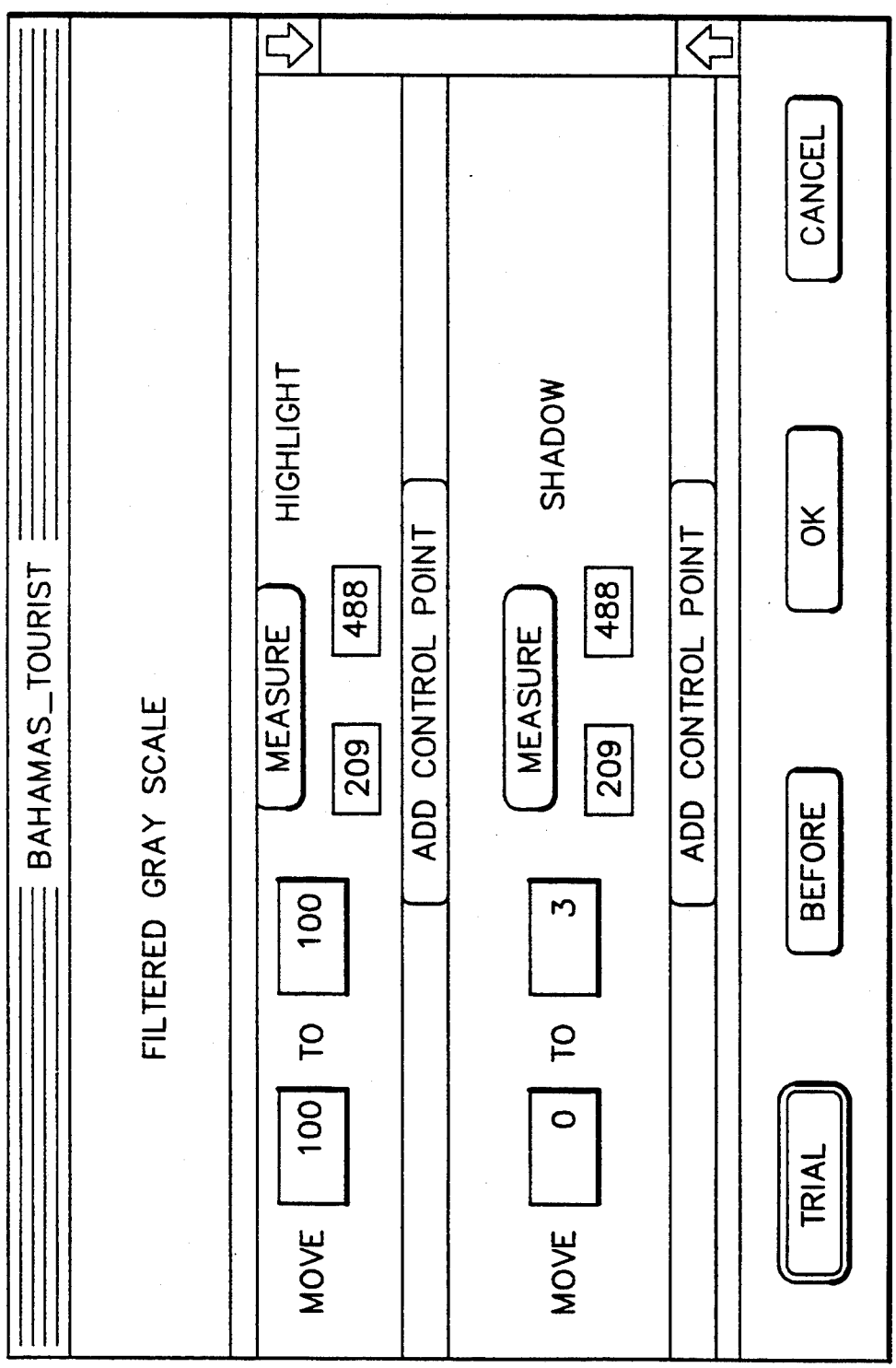
FIGS. 12a-12d show an operator control panel for initializing a tone correction according to the present invention.

The system software displays control panels as shown in FIGS. 12A–12D. FIG. 12A shows an initial control panel. By calling up the control panel, the image processing apparatus automatically remaps the image with a default tone transform, which may be one or a combination of tonal transforms described above. When the control panel is activated, the apparatus selects a darkest shadow and brightest highlight from the image as default control points.

Figure 12B:
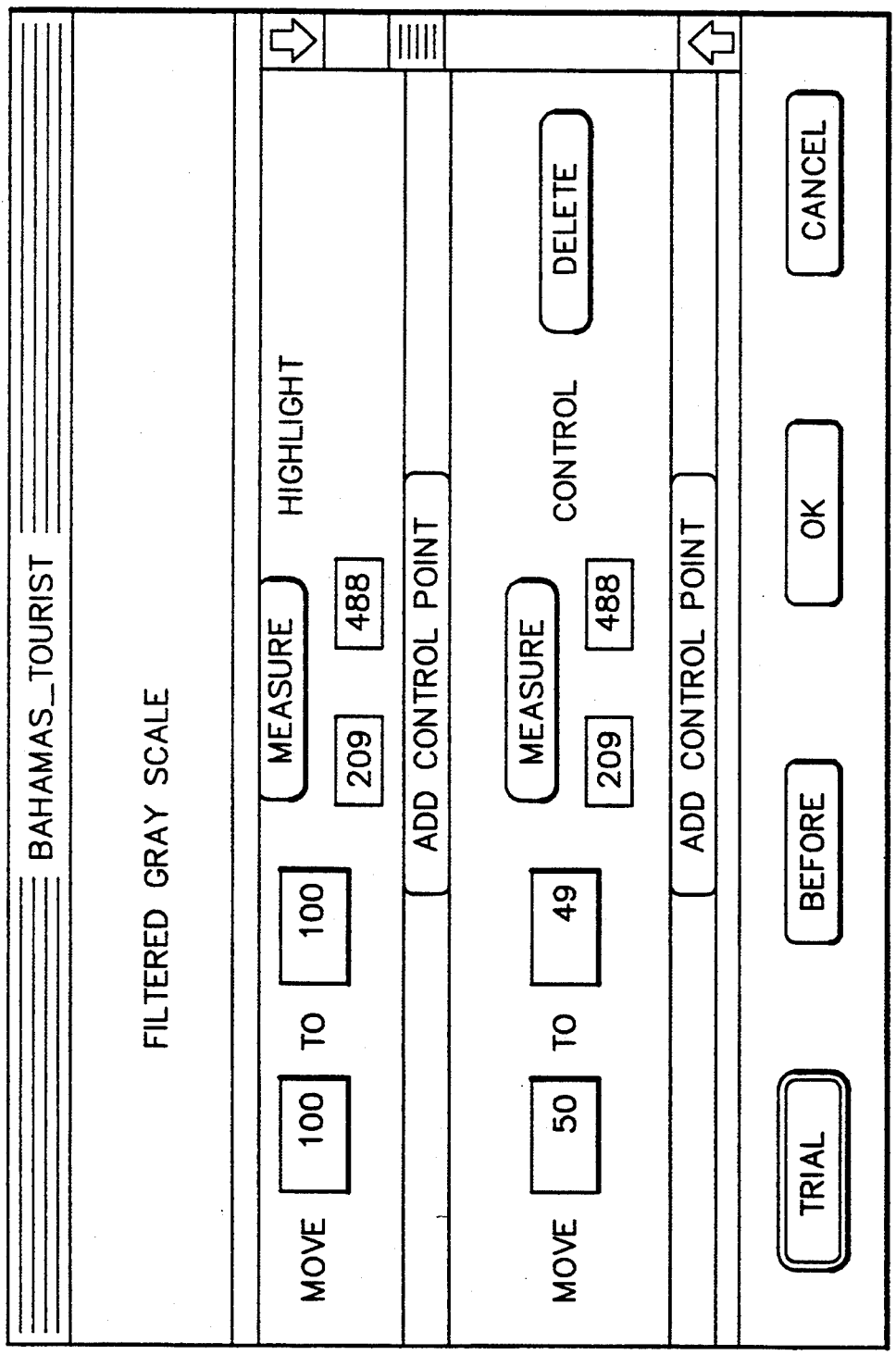

FIG. 12B shows a control panel used to add a new point to the transform curve. When a control point is initially added, its default "From" value is midway between the "From" values of adjacent control points; thus, for the first point added, the default "From" value will be midway between the shadow and highlight values. The "To" value of the new point will default to the existing transform applied to the "From" value. Thus, simply adding a control point without changing the "From" or "To" value does not by itself change the transform.

Figure 12C:
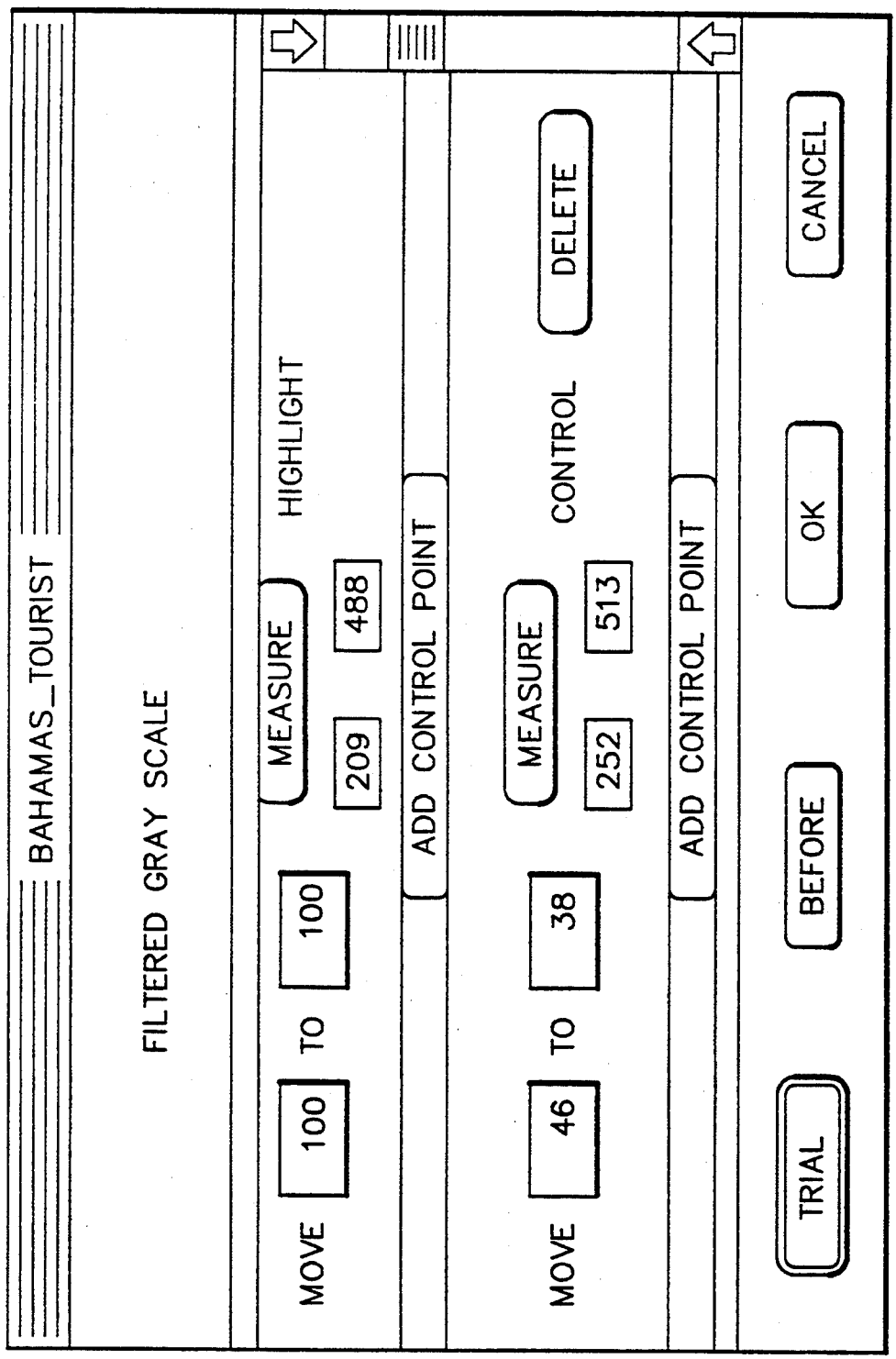
Figure 12D:
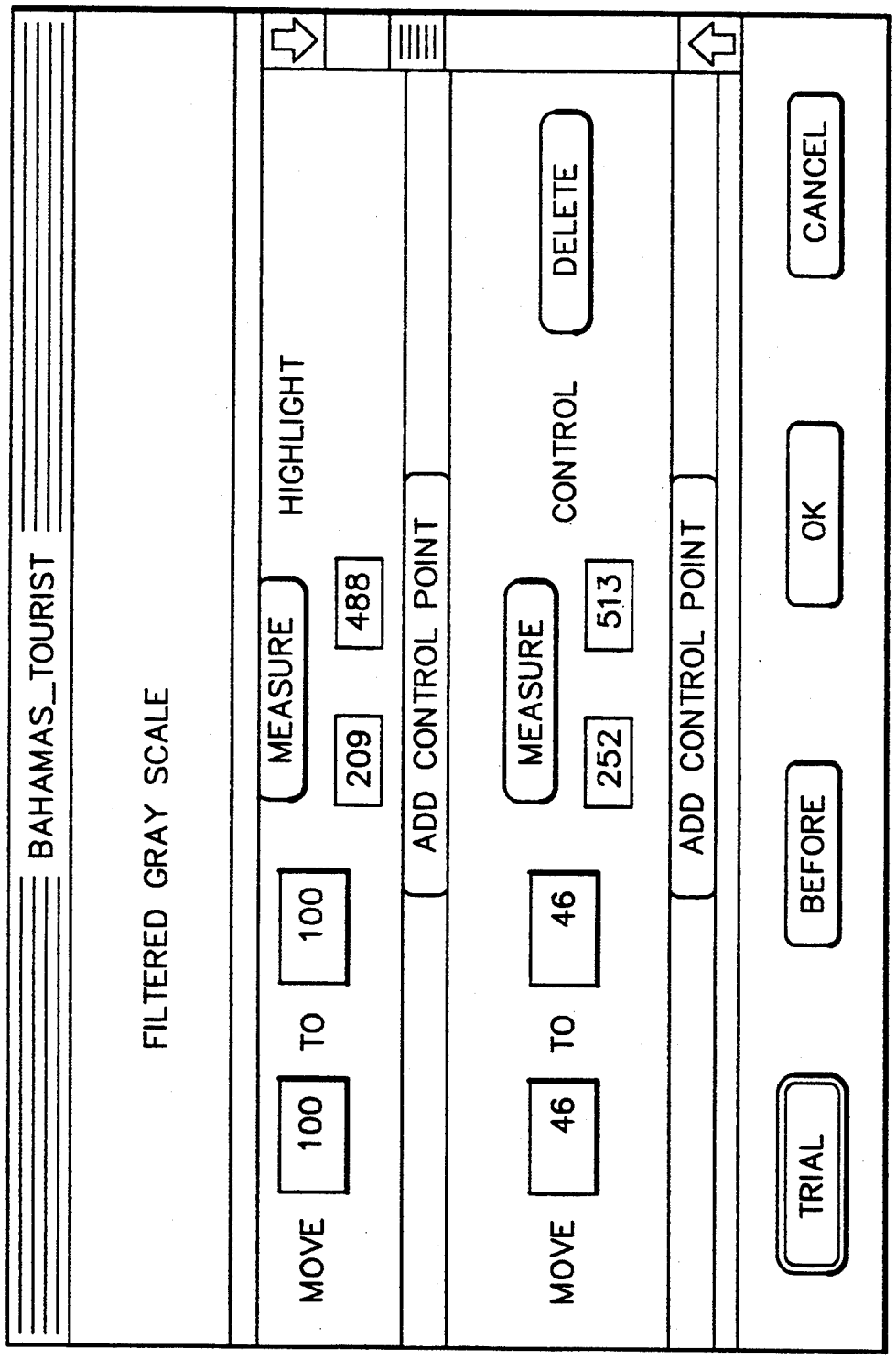

FIG. 12C shows the use of a "Measure" function selectable from the control panel. The operator may use a mouse or other input device to position a measurement cursor on a portion of the image and then activate the Measure function to update the "From" value of the point to the luminance value of the portion of the image under the measurement cursor. Such a capability is described in more detail in copending U.S. patent application Ser. No. 07/983,154, entitled "Image Processing Apparatus and Method with Intelligent Pixel Measurement Cursor" (incorporated here by reference). The operator then enters a "to" value which is displayed on the control panel. FIG. 12D reflects a value 46 input by the operator. Operator input alternately may take the form of directional changes in tone (e.g., "up" or "down"), by an operator-supplied increment (e.g., plus 20% or plus 40 units) or other command.

Figure 13:
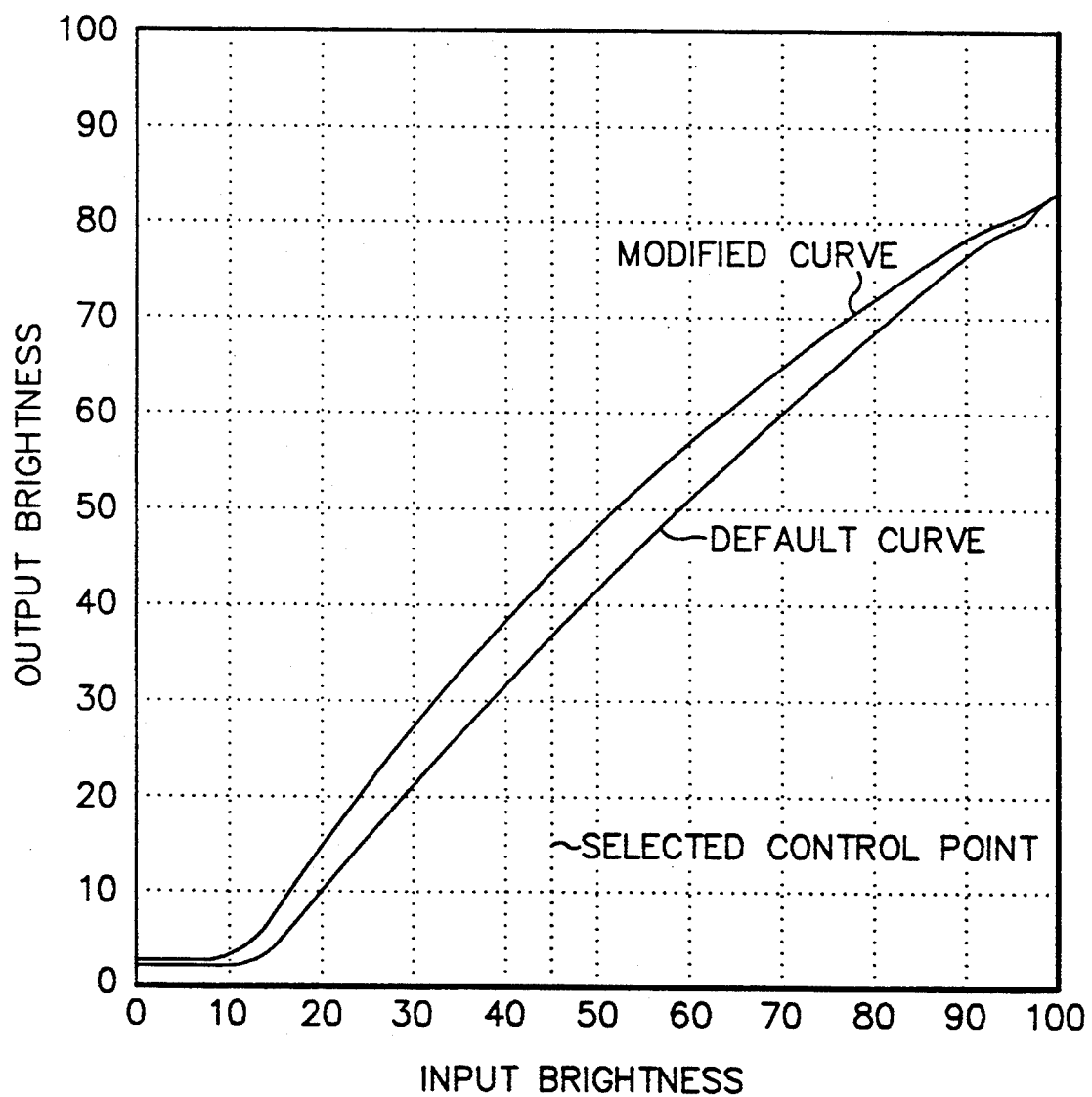
FIG. 13 is a graph illustrating a correction curve, and the automatic tonal modified curve specified by the control panel in FIG. 12.

The tonal transforms which result from the operations requested in FIGS. 12A–D are shown in FIG. 13. The curves show the default and modified tonal curves for the chrominance of the object which the operator had selected. (The object in this case was the arm of a tanned Caucasian woman. The color was u'=0.252, v'=0.513, L=46). Because the example also includes the gamut compensation transform, the maximum output value is less than 100. The effect of the operator transform is to pull the fleshtones back up to their original brightness. Note, however, that over small brightness intervals, the local shape of the curve is not affected very much.

It should be understood that the application of such mappings results in a transformation of an original image, such as a photograph, into a transformed image. In order to make the image palatable to the computer, the image has been expressed in a binary equivalent form within the image processing system. Application of the transform changes the amplitude of selected pixels and results in a modified image still in binary form. The image then may be stored, printed, or transmitted electronically over a communication channel. Nevertheless, it is still an image.

Although a few preferred embodiments of the invention have been shown and described, it will be appreciated by those skilled in the art that changes may be made in these embodiments without departing from the principles and the spirit of the invention, the scope of which is defined in the appended claims.

What is claimed is:

1. A method for improving tone of an original image comprising steps of:
   - generating a pixel representation of the original image;
   - filtering the pixel representation with a filter having a response peak near a spatial frequency at which the human eye is highly sensitive;
   - converting pixel tones to emphasize patterns in the original image having tone values which vary at a spatial frequency at which the human eye is highly sensitive, thereby generating an improved image.

2. The method of claim 1 wherein the converting step comprises steps of:
   - modifying the pixel representation according to a tonal transform;
   - displaying to an operator the modified pixel representation;
   - receiving from an operator at least one command to alter a tone selected from the displayed representation;
   - generating a modification transform which maps image tones according to the operator command; and
   - modifying the image according to the modification transform, thereby generating an improved image.

3. The method of claim 2 wherein the transform generating step fits a curve defining transform relationships for a plurality of tones to a transform relationship derived from the operator command.

4. The method of claim 3 wherein the curve is a cubic spline.

5. A method for improving tone of an original image comprising steps of:
generating a pixel representation of the original image;
filtering the pixel representation with a filter having a response peak near a spatial frequency at which the human is highly sensitive;
computing an effect value for pixels based on filtered pixel values;
generating a first histogram from pixels having effect values greater than a threshold; and
generating a second histogram from pixels having effect values less than the threshold;
converting pixel tones in accordance with the first and second histograms, thereby generating an improved image.

6. The method of claim 5 wherein a histogram generating step accumulates effect function values for pixels in each of a series of brightness bins.

7. The method of claim 5 wherein a histogram generating step clips histogram values according to a local threshold, thereby removing spikes.

8. The method of claim 5 wherein a histogram generating step smooths histogram values.

9. The method of claim 5 further comprising a step of generating a normal histogram of brightness of pixels in the pixel representation.

10. The method of claim 9 further comprising steps of combining and cumulating the first, second and normal histograms to generate a cumulated normalized histogram.

11. The method of claim 9 further comprising steps of cumulating each of the first, second and normal histograms and then combining the cumulated histograms into a cumulated normalized histogram.

12. The method of claim 9 further comprising steps of:
combining and cumulating the first, second and normal histograms to generate a cumulated normalized histogram; and
equalizing the cumulated and normalized histogram.

13. A method for improving tone of an original image comprising the steps of:
generating a pixel representation of the original image;
modifying pixel tones; and
modifying pixel chrominance in accordance with the amount of tone modification, there by generating a tone-modified image with colorfulness compensation and wherein such tone modifying step includes:
(i) filtering the pixel representation with a filter having a frequency repsonse peak near a spatial frequency at which the human eye is highly sensitive; and
(ii) converting tones of pixels to emphasize patterns in the original image having tone values which vary at a spatial frequency at which the human eye is highly sensitive.

14. A method for improving tone of an original image and compensating for tone alteration imposed by a limited output gamut comprising steps of:
generating a pixel representation of the original image;
storing the pixel representation in memory of a programmed computer;
modifying the pixel representation at least in part according to a tonal transform producing colors outside the gamut; and
modifying the pixel representation at least in part according to a compensation transform which modifies tone in relation to an amount of tone alteration imposed by the limited output gamut, thereby generating an improved image.

15. The method of claim 14 wherein each of the modifying steps is performed sequentially.

16. The method of claim 14 wherein two of the modifying steps are performed as a composite step using a composite transform.

17. The method of claim 14 wherein the three modifying steps are performed as a composite step using a composite transform.

18. The method of claim 14 wherein the compensation transform comprises a linear mapping of the tonal transform output in conjunction with an inverse mapping of the compression transform.

19. The method of claim 14 wherein the compensation transform comprises a non-linear mapping of the tonal transform output in conjunction with an inverse mapping of the compression transform, and the non-linear mapping retains more contrast in brighter parts of the image than in darker parts.

20. The method of claim 14 wherein the compensation transform modifies tone as a function of chrominance.

21. The method of claim 20 wherein the compensation transform attenuates tone as a function of a maximum brightness below which the compression transform shifts color less than a significant amount.

22. The method of claim 20 wherein the compensation transform attenuates darker tones less than brighter tones.

23. The method of claim 14 further comprising steps of:
displaying to an operator an image modified by the basic and compensation transforms;
receiving from an operator at least one command to alter a tone selected from the displayed image;
generating a modification transform which maps image tones according to a transform relationship derived from the operator command; and
further modifying the pixel representation according to the modification transform, thereby generating a further improved image.

24. The method of claim 23 wherein the transform generating step fits a curve defining transform relationships for a plurality of tones to a transform relationship derived from the operator command.

25. The method of claim 24 wherein the curve is a cubic spline.

26. A method for improving tone of an original image and compensating for a limited output gamut comprising steps of:
generating a pixel representation of the original image;
generating an initial tonal transform that emphasizes patterns in the original image having tone values which vary at a spatial frequency at which the human eye is highly sensitive,
displaying the pixel representation to an operator;
receiving from the operator at least one command to alter a tone selected from the displayed image;

generating a manual transform which further maps image tones according to the received command while preserving the character of the initial tonal transform; and modifying the pixel representation according to the initial and manual transforms, thereby generating an improved image.

* * * * *